United States Patent [19]
Köhler

[11] Patent Number: 5,877,702
[45] Date of Patent: Mar. 2, 1999

[54] REMOTE CONTROL SYSTEM, START BIT FOR BIPHASE ENCODING SCHEME

[75] Inventor: Hans E.P. Köhler, Eindhoven, Netherlands

[73] Assignee: U.S. Philips Corporation, New York, N.Y.

[21] Appl. No.: 88,397

[22] Filed: Jul. 7, 1993

Related U.S. Application Data

[63] Continuation of Ser. No. 782,875, Oct. 17, 1991, abandoned, which is a continuation of Ser. No. 570,239, Aug. 17, 1990, abandoned.

[30] Foreign Application Priority Data

Mar. 16, 1990 [NL] Netherlands ............................ 9000603

[51] Int. Cl.⁶ ...................................................... H04Q 1/00
[52] U.S. Cl. .............................. 340/825.72; 340/825.69; 375/55; 375/117
[58] Field of Search ......................... 340/825.69, 825.72, 340/825.44; 370/101, 111; 375/55, 117; 359/148, 183

[56] References Cited

U.S. PATENT DOCUMENTS

| | | | |
|---|---|---|---|
| 4,118,791 | 10/1978 | Swain | 375/117 |
| 4,310,922 | 1/1982 | Lichtenberger | 370/101 |
| 4,427,980 | 1/1984 | Fennell et al. | 340/825.44 |
| 4,638,478 | 1/1987 | Hatabe | 370/101 |
| 4,730,188 | 3/1988 | Milheiser | 340/825.72 |
| 4,748,643 | 5/1988 | Setoguchi | 375/117 |
| 4,885,579 | 12/1989 | Sandbank | 340/825.72 |
| 4,894,826 | 1/1990 | Aggers et al. | 340/825.44 |
| 4,914,649 | 4/1990 | Schwendeman | 340/825.44 |
| 4,980,681 | 12/1990 | Noel | 340/825.72 |
| 5,043,723 | 8/1991 | Araki | 340/825.69 |

*Primary Examiner*—Brian Zimmerman
*Attorney, Agent, or Firm*—Edward W. Goodman

[57] ABSTRACT

Remote control system for transmitting messages whose length is adapted to the nature of the operating command and to the quantity of information to be transmitted. Each message is provided with an "anti-phase start bit" in order to prevent a long message from being interpreted as a different, equally valid, shorter message in the case of incomplete reception.

9 Claims, 5 Drawing Sheets

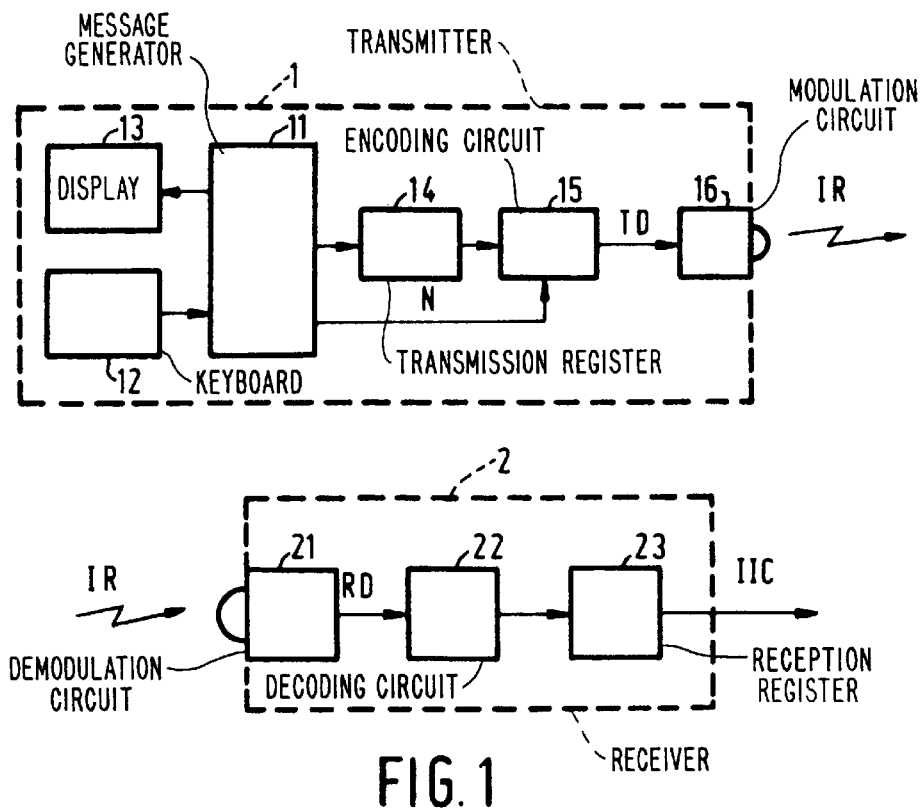
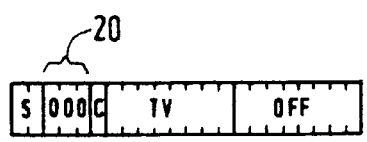
FIG.2A
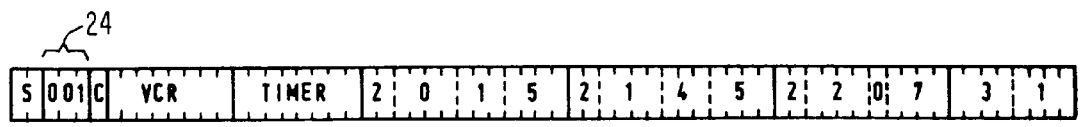
FIG.2B

REMOTE CONTROL SYSTEM, START BIT FOR BIPHASE ENCODING SCHEME

This is a continuation of application Ser. No. 07/782,875, now abandoned filed on Oct. 17, 1991, which is a continuation of Ser. No. 07/570,239, filed on Aug. 17, 1990 now abandoned.

BACKGROUND OF THE INVENTION

The invention relates to a remote control system comprising a transmitter and a receiver, the transmitter comprising generating means for generating a message consisting of a series of bits, the first of which is a start bit having a predetermined value, an encoding circuit for converting each bit of the message into a biphase bit having a predetermined bit period which comprises a first and a second bit interval and whose logic value is represented by the presence of a pulse in the first or the second bit interval, means for transmitting a biphase signal thus obtained to the receiver, and the receiver comprising means for receiving the transmitted biphase signal, a decoding circuit for decoding the start bit, starting in response thereto a periodical reference signal whose period corresponds to the predetermined bit period, and for regaining the message. The invention also relates to a transmitter and a receiver suitable for use in such a remote control system.

A remote control system of the type described in the opening paragraph is constituted, for example, by the integrated circuits SAA3006 and SAA3028 from the Firm of Philips, which circuits are described in "Data Handbook IC02a of Philips Electronic Components and Materials, 1988". Such a remote control system is used for the wireless transmission of operating commands from a remote control unit to an apparatus to be operated by means of, for example, infrared light. In the known remote control systems each message comprises two start bits, one control bit, five address bits and six command bits. The address bits indicate for which apparatus (for example television receiver or video recorder) the message is intended. The command bits indicate the function to be operated on the apparatus mentioned. The control bit indicates whether the message comprises a command other than the foregoing or whether it forms part of a series of repeatedly transmitted identical messages.

Complicated commands frequently consist of a plurality of sub-commands. For example, the video recorder command "record the television program on channel 31 from 20.15 hours to 21.45 hours on 22 July" comprises a sub-command "timer" and a plurality of further sub-commands each comprising a number for the start and stop time, date and channel. The transmitter is often adapted in such a way that the command to be transmitted is first composed on the remote control unit, checked for consistency with a predetermined protocol and only sent after a transmission key has been energized.

In the known remote control system each sub-command is transmitted as a separate message. However, this is not economical because each message comprises the start bits and the control bit, as well as the address bits for addressing the same video recorder. Moreover, there is a risk that short interruptions of the infrared light may lead to erroneous reactions of the receiving apparatus. For example, if the message with the sub-command "timer" is not received, the sub-commands in the subsequent messages are interpreted erroneously, for example as instructions for tuning to a new channel number.

SUMMARY OF THE INVENTION

It is an object of the invention to provide a remote control system with which operating commands can be transmitted in an effective and reliable manner. It is a further object of the invention to provide a transmitter and a receiver for such a remote control system.

To this end the remote control system according to the invention is characterized in that the generating means are adapted to generate distinct messages in series of variable lengths and in that the decoding circuit is adapted to regain the original message from said variable-length series. It is thereby achieved that the length of each message can be adapted in an optimum manner to the nature of the operating command and to the quantity of information to be transmitted. For example, the previously mentioned command for programming a video recording is now transmitted in one long message. If such a message is received incompletely, for example, due to an interruption of the infrared light ray, the command will not be carried out. This reduces the risk of erroneous reactions in the case of an incompletely received message.

However, the use of variable-length messages does not entirely exclude situations in which a part of a long message at the receiver end is decoded as a different, equally valid, short message. This may be the case, if the "header" of a long message is not received and if the remaining part represents a valid short message.

To meet this problem, the encoding circuit is further adapted to generate a biphase marking bit as a start bit which is distinguished from the other bits by its bit period, the second bit interval of the marking bit being at least equal to the bit period of the other biphase bits, and the decoding circuit is further adapted to decode said biphase marking bit and to ignore the message if no biphase bit is received during a period of the reference signal after the occurrence of the marking bit. The effect achieved thereby will be explained separately for the case where the second bit interval of the start bit is larger than the bit period of the other bits and for the case where they are equal to each other. In this respect it should be considered that a pulse may be present or absent in a biphase signal during a period which is at most equal to one bit period. This occurs, for example, when the pulse is absent in the second bit interval in the case of one bit and in the first bit interval in the case of the next bit. If the second bit interval of the start bit is larger than the bit period of the other bits, the start bit represents a unique signal which cannot further occur in the message. If this start bit is not received, for example due to a short interruption of the infrared light ray by a moving object, the received message is ignored because the start bit is absent. If the second bit interval of the start bit is equal to the bit period of the other bits, a specific combination of two consecutive biphase bits which are received after the infrared light ray has been interrupted can be interpreted as a valid start bit. However, this situation leads to a state in which the phase of the reference signal started by the decoding circuit is shifted with respect to the actual bit periods. In this state one of the next periods of the reference signal will generally not comprise a biphase bit. The message is then as yet ignored.

A further embodiment of the transmitter and the receiver is characterized in that the generating means are adapted to add a code to the message, which code is indicative of the number of bits comprised by the message and in that the decoding circuit is adapted to decode said code and to ignore the message if the number of bits in the received message does not correspond to said code. It is thereby achieved that an interruption of the infrared light ray is also detected if it occurs after the start bit has been received. Thus, a very large degree of reliability of the remote control system is achieved.

A still further embodiment of the transmitter and the receiver is characterized in that the encoding circuit is adapted to generate a further biphase marking bit for at least one predetermined further bit in the message and in that the decoding circuit is adapted to decode the further marking bit and to ignore the message if the further marking bit is not received. It is achieved with the further marking bit that the biphase signal comprises a unique pulse series at all times, which pulse series cannot occur in the remaining part of the message when the received signal has been interrupted at the start of a message.

BRIEF DESCRIPTION OF THE DRAWINGS

FIG. 1 shows diagrammatically the general structure of a remote control system according to the invention.

FIGS. 2A and 2B show a format of a message to explain the remote control system shown in FIG. 1.

DETAILED DESCRIPTION OF PREFERRED EMBODIMENTS OF THE INVENTION

Figure 3:
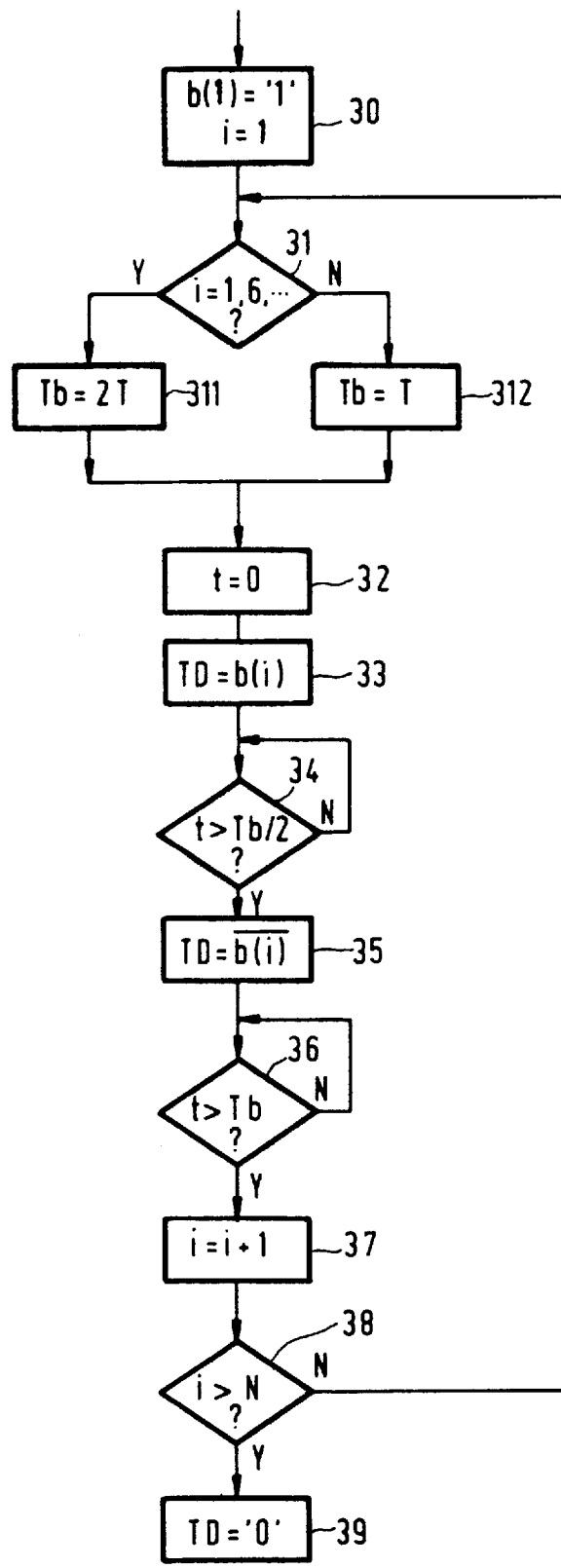
FIG. 3 shows the flowchart of an encoding program for use in the remote control system of FIG. 1.

FIG. 1 shows diagrammatically the structure of a remote control system according to the invention. The system comprises a transmitter 1 and a receiver 2. The generating means for generating a message are constituted by a message generator 11, a keyboard 12, a display 13 and a transmission register 14. An encoding circuit 15 applying a biphase signal TD to a modulation circuit 16 for modulating the biphase signal on an infrared light signal IR is connected to the transmission register 14. The receiver 2 comprises a demodulation circuit 21 which receives the infrared light signal IR and applies a received biphase signal RD to a decoding circuit 22. The decoding circuit 22 is connected to a reception register 23 which is coupled through a bus IIC to an apparatus (not shown) to be operated. In practice the message generator 11, transmission register 14 and encoding circuit 15 are preferably combined in a microprocessor, for example of the type 80C51 of the Firm of Intel. Decoding circuit 22 and reception register 23 may form part of a microprocessor of the same type accommodated in the apparatus to be operated.

The message generator 11 is adapted to scan the keyboard 12 and to store a message corresponding to the operated key or series of keys in the transmission register 14. For example, the message generator is adapted to store a so-called single message in a direct mode. Such a single message comprises a command corresponding to a single key. FIG. 2A shows as an example a message for switching off a television receiver. The message comprises two start bits S, three mode bits 20 which indicate by means of the value "000" that it is a single message having a predetermined length, a control bit C, eight address bits "TV" for addressing the television receiver and eight command bits "OFF" which correspond to the operated "off" key.

More particularly, the message generator 11 is further adapted to store a so-called composite message in a programming mode. Such a composite message comprises a plurality of sub-commands which correspond to a series of operated keys. FIG. 2B shows as an example a message for programming a video recording on a video recorder. This message comprises two start bits S, three mode bits 24 which now indicate by means of the value "001" that it is a composite message, one control bit C, eight address bits "VCR" for addressing the video recorder, eight command bits for a sub-command "TIMER", thirteen bits for the entered start time "2015", thirteen bits for the entered stop time "2145", eleven bits for the date "2207" and eight bits for the channel number "31".

The length of a message is now determined by the nature of the message and is indicated by the mode bits. Single messages with mode bits "000" have a length of 22 bits in the above-mentioned example. The composite messages with mode bits "001" have a length of 67 bits. It will hereinafter be assumed that a message comprises N bits b(1) . . . b(N). As is shown in FIG. 1, this number of bits is applied by the message generator 11 to the encoding circuit 15 by means of a signal N.

The message stored in the transmission register 14 is read by the encoding circuit 15 and converted into a biphase signal TD. As already mentioned, the encoding circuit forms part of a microprocessor. The biphase signal TD is then generated, for example, at a so-called port connection of this microprocessor under the control of an encoding program performed by the microprocessor. FIG. 3 shows a flowchart of such an encoding program. It comprises a step 30 for initiating a variable i indicating the index of the bit b(i) to be converted into a biphase bit. In a step 31 it is subsequently checked whether bit b(i) must be transmitted in the form of a marking bit. To this end the index i is compared with a plurality of predetermined values. The value i=1 forms part thereof because the first start bit is a marking bit by agreement. In the example shown in FIG. 3 the control bit b(6) is also transmitted in the form of a marking bit. If the bit b(i) to be transmitted is a marking bit, the value of 2T is assigned to a variable Tb, which indicates the bit period, in a step 311. In a step 312 a bit period T is assigned to the remaining "ordinary" biphase bits in a corresponding manner.

In a step 32 of the encoding program the value of zero is assigned to a time variable t. It is assumed that this time variable t is autonomously raised in time, for example, by means of a timer/counter circuit which is often present in a microprocessor. In a step 33 the biphase signal TD acquires a logic value which is equal to the value of the bit b(i) to be converted. In a step 34 the encoding program subsequently waits for a period of time which is half the bit period Tb. In a step 35 the biphase signal subsequently acquires the inverse value of the bit b(i) to be converted, whereafter in a step 36 a waiting time is observed until the time variable t has reached the value Tb.

In order to check whether there are still bits to be converted in the transmission register, the index i is raised by 1 in a step 37 and it is tested in a step 38 whether the value N is exceeded thereby. If this is not the case, the encoding program returns to step 31 so as to convert the next bit. In the other case, the message has been terminated and the biphase signal TD further acquires the logic value "0" in a step 39.

FIG. 4B shows a time diagram of a biphase signal TD which is generated by the encoding circuit 15 (see FIG. 1).

The signal has a constant logic value "0" as long as no message is transmitted and it comprises a series of biphase bits during the transmission of a message. As is shown in FIG. 4A, each biphase bit comprises a first bit interval 40 in which the biphase signal has the logic value of the corresponding bit of the message, and a second bit interval 41 in which the biphase signal has the inverted value. The first and the second bit interval combined constitute the bit period. The biphase signal TD shown in FIG. 4B comprises a biphase start bit 42 of the value "1" in the form of a marking bit with bit period 2T, a further start bit 43 and mode bits 44 with a bit period T, a control bit 45 with bit period 2T in the form of a marking bit and a further series of biphase bits 46 with bit period T. The respective bit periods are indicated by means of marking stripes in FIG. 4C. These marking stripes correspond to the instants when the value zero was assigned to the time variable t by the encoding program (step 32 in FIG. 3).

As already shown in FIG. 1, the biphase signal TD is modulated in known manner in the transmitter 1 on an infrared light ray IR and is subsequently demodulated in the receiver 2. The demodulated biphase signal RD thus obtained is applied to the decoding circuit 22. This circuit is preferably a microprocessor and receives the biphase signal RD, for example, at a so-called "interrupt request" input. The operation of a decoding program performed by the microprocessor will now be explained with reference to a flowchart shown in FIG. 5.

In a step 50 of the decoding program a waiting time is observed until a pulse occurs at the interrupt request input indicating the start of a message. Subsequently several variables are initiated in a step 51. In a variable i the number of received biphase bits is counted. A logic variable tr represents a reference instant and indicates whether the last received edge in the biphase signal RD corresponds to the start of a reference period T (tr=0) or to the middle of a reference period (tr=T/2). The reference period is equal to the bit period T of an "ordinary" biphase bit. A further logic variable MB indicates by means of the logic value "1" that no edge has been received during such a reference period and that therefore a bit interval of a marking bit has been detected.

In the step 50 the first bit interval of the start bit has been detected. This start bit is considered to be a marking bit. Hence, the variable MB acquires the logic value "1" in a next step 51. Also, in this step 51 the counter i acquires the initial value of zero and the reference instant tr acquires the value tr=0. In a step 52 a time variable t subsequently acquires the value of the reference instant tr. It is again assumed that this time variable t is autonomously raised in time. In a step 53 it is checked whether an edge occurs in the biphase signal RD. If this is not the case, it is checked in a step 54 how long such an edge does not occur. If this is longer than a predetermined period, for example 10T, the message is considered to be terminated.

If an edge is received, the decoding program determines in program steps 55–59 the state of the biphase signal RD with reference to the instant t when the edge has occurred and the reference instant tr when the previous edge has occurred. For further explanation, FIGS. 6A–6E show five possible states of a biphase signal during reception of a message. These states correspond to the letters A–E in FIG. 5.

Figure 5:
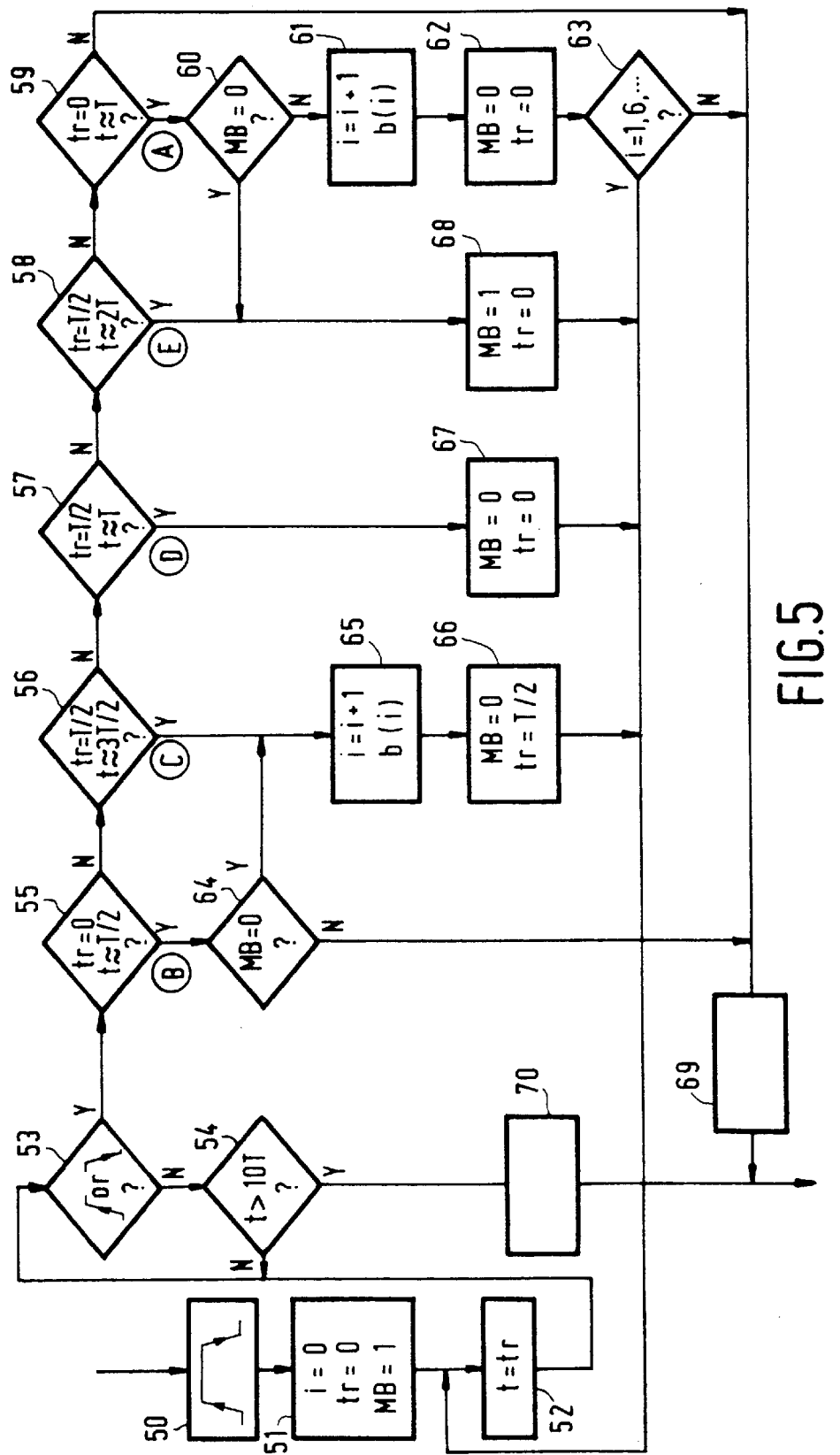
FIG. 5 shows the flowchart of a decoding program for use in the remote control system of FIG. 1.
Figure 6A:
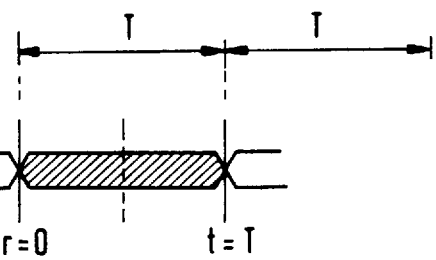
FIGS. 6A through 6E show some further time diagrams to explain the decoding program of FIG. 5.

FIG. 6A shows the state when an edge occurs at an instant t=T while the reference instant tr=0 was assigned to the previous edge. The "approximately equal to" symbol indicates that an edge need not occur at an exactly determined instant but that previously determined deviations may be tolerated without affecting the operation of the decoding circuit. The state shown in FIG. 6A indicates that no "ordinary" biphase bit has been received because there has not been an edge in the middle of the reference period T. Therefore, a marking bit with bit period 2T is received. The decoding program now checks in a step 60 (see FIG. 5) whether the first bit interval is received. Then the variable MB had the logic value "0" and a step 68 is performed. In this step the variable MB is rendered "1" so as to indicate that the first bit interval of a marking bit is considered to be received. Moreover, the value tr=0 is assigned to the reference instant. If the variable MB already had the logic value "1", the second bit interval of a marking bit has apparently been received. In a step 61 the counter i is raised then by 1 and the decoded bit b(i), being "1" at a falling edge and "0" at a rising edge, is stored in the reception register (23 in FIG. 1). Subsequently, the variable MB acquires the logic value "0" again in a step 62 and the reference instant tr=0 is assigned to the instant when the current edge has occurred. In a step 63 it is subsequently checked whether the received marking bit is allowed at the given position i in the message. To this end the counter i is compared with one or more predetermined values. The steps 61–63 are notably performed when the start bit is received. The position i=1 therefore forms part of the predetermined values because the start bit is a marking bit by agreement. The decoding program thereafter returns to the step 52 in which the time variable t acquires the value of the reference instant, in this case tr=0, and subsequently waits for the next edge in the biphase signal RD. If it has been determined in the step 63 that no marking bit was allowed at the given position i, the decoding program performs an error routine 69 in which all subsequent edges are ignored until the end of the message.

Figure 6B:

FIG. 6B shows the state in which an edge occurs at an instant t=T/2, while the reference instant tr=0 was assigned to the previous edge. In this state an "ordinary" biphase bit of bit period T is apparently received. In a step 64 (see FIG. 5) the decoding program checks whether the variable MB has the value "0". If MB has indeed the logic value "0" the counter i is raised by 1 in a step 65 and the decoded bit b(i) is written in the reception register. In a step 66 reference instant tr now acquires the value tr=T/2 so as to indicate that the edge which has just been detected has occurred in the middle of a reference period T. If MB does not have the logic value "0", an invalid message has been detected. In that case the decoding program performs the error routine 69.

Figure 6C:
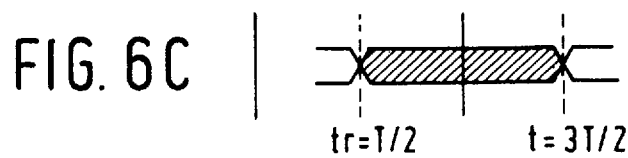

FIG. 6C shows the state in which an edge occurs at an instant t=3T/2, while the reference instant tr=T/2 was assigned to the previous edge. Also in this state an "ordinary" biphase bit with bit period T is received. It differs from the state shown in FIG. 6B only in that the value of the biphase signal RD at the boundary of the present and the previous reference period has not changed. The decoding program therefore performs the same steps 65 and 66.

Figure 6D:
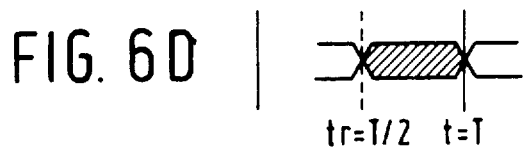

FIG. 6D shows the state in which an edge occurs at the instant t=T while the previous edge occurred at the instant tr=T/2. This is an edge which occurs at the boundary of the present and the previous reference period. This state does not require any further action and in a step 67 (see FIG. 5) an adapted value tr=0 is assigned to the reference instant only.

Figure 6E:
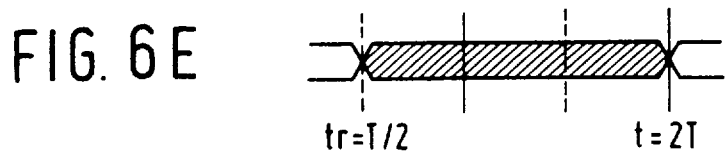

FIG. 6E shows a state in which an edge occurs at the instant t=2T while the previous edge occurred at the instant tr=T/2. Now it is unambiguous that the first bit interval of a marking bit is received. In the step 68 (see FIG. 5) previously described the variable MB therefore acquires the logic value "1". The value tr=0 is assigned to the reference instant.

After termination of the message, the received message is evaluated in a step 70. In this step the message length encoded in the mode bits b(3) . . . b(5) is compared with the actually received number of bits.

Figure 4:
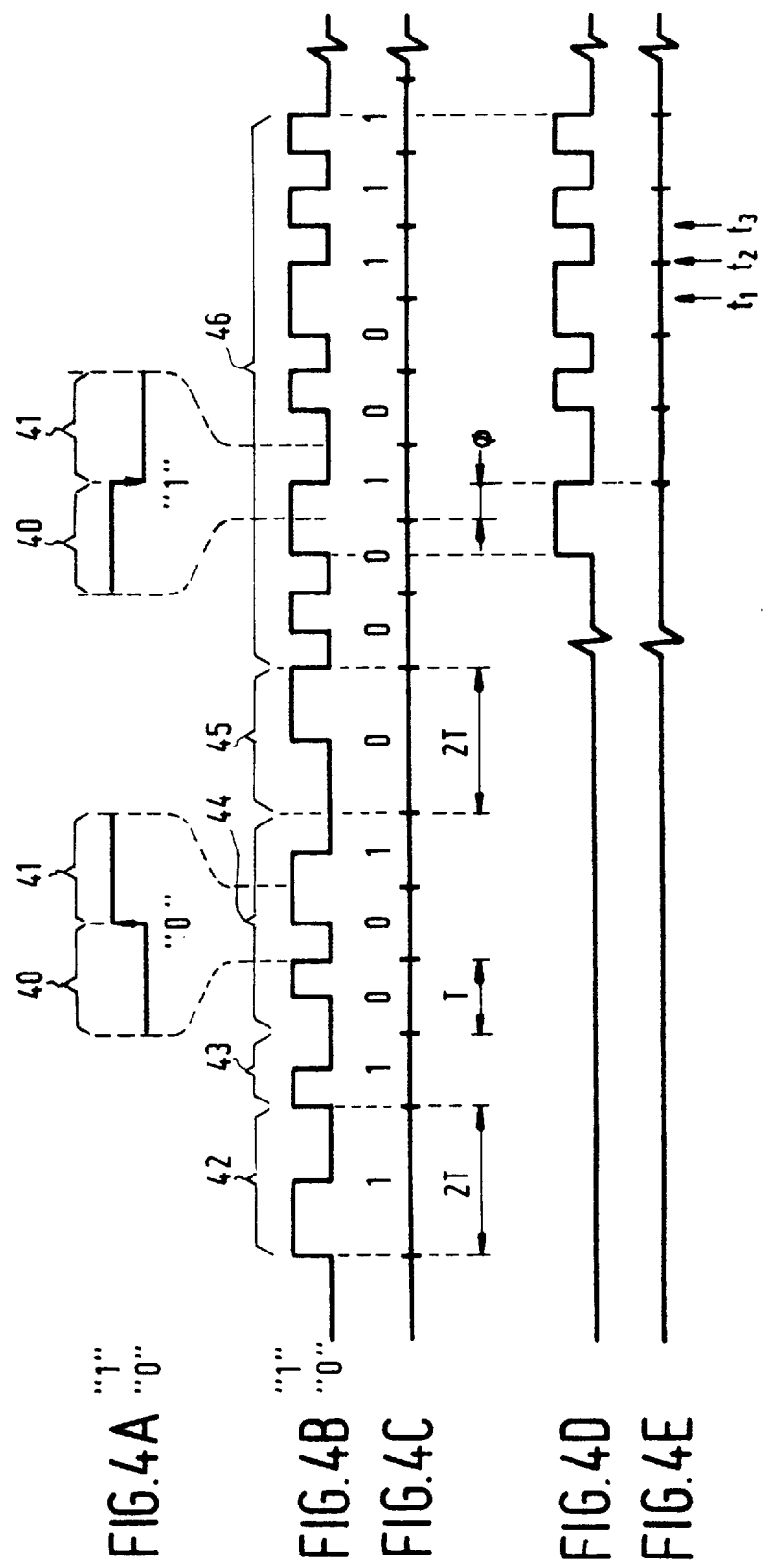
FIGS. 4A through 4E show some time diagrams to explain the encoding program of FIG. 3 and the decoding program of FIG. 5.

In the decoding program shown in FIG. 5 the instants when the time variable t in the described decoding program acquires the value t=0 constitute, as it were, a reference signal which in the case of a faultless reception is in phase with the bit periods generated by the transmitter. This reference signal is "started" by the falling edge of the start bit in the steps 51 and 52 of the decoding program and subsequently synchronised with the further edges in step 52. FIG. 4D shows the time diagram of a demodulated biphase signal RD which is produced because the transmitted biphase signal shown in FIG. 4B was incompletely received, for example because the infrared ray was interrupted by a moving object for a short time. This results in the situation that a specific combination of two consecutive "ordinary" biphase bits is interpreted as a start bit by the decoding circuit. FIG. 4E shows the corresponding reference signal by means of marking stripes. As is apparent from a comparison of FIG. 4E and FIG. 4C, the reference signal is now shifted in phase with respect to the original bit periods. This phase shift, which is denoted by φ in FIG. 4, is caused by the absence of a "real" marking bit. For this reason a marking bit is also referred to as "anti-phase" bit. The result of the phase shift is that edges in the received signal are absent at instants when these edges should occur in accordance with the biphase encoding. For example, an edge at the instant t=t1 is absent in the biphase signal shown in FIG. 4D. The decoding program (step 68 in FIG. 5) interprets this in the first instance at the instant t=t2 as the first bit interval of a second marking bit. At the subsequent edge at the instant t=t3, however, the decoding program detects an inadmissible state and therefore an invalid message (step 64 in FIG. 5).

It is to be noted that it is not necessary for the mode bits to indicate the message length in an absolute sense. For example, it is possible for the mode bits to indicate at which position in the message the actual length is located.

Finally it is to be noted that it is sensible to extend the first bit interval of the start bit to some extent. This gives an automatic gain control circuit incorporated in the demodulator more time to adapt the gain.

I claim:

1. A transmitter for use in a remote control system, the transmitter comprising:
   generating means for generating a series of message bits constituting a message to be transmitted and a start word preceding the message bits;
   an encoding circuit for converting the message bits into biphase bits having a predetermined bit period which comprises a first and a second bit interval and whose logic value is represented by a pulse during one of the first and second bit intervals; and
   means for transmitting a biphase signal thus obtained to a receiver;
   wherein the encoding circuit converts the start word into a biphase start bit having the pulse during the first interval, said start bit being distinguished from the other biphase bits in that the second bit interval of the biphase start bit is equal to the bit period of the other biphase bits.

2. A transmitter as claimed in claim 1, wherein the generating means generates distinct messages in series of variable lengths and adds a code to the message, said code being indicative of the number of bits comprised by the message.

3. A transmitter as claimed in claim 1, wherein the encoding circuit generates for a predetermined further message bit, a biphase bit of which at least one of the first and second bit intervals is equal to the bit period of the other biphase bits.

4. A transmitter as claimed in claim 2, wherein the encoding circuit generates for a predetermined further message bit, a biphase bit of which at least one of the first and second bit intervals is equal to the bit period of the other biphase bits.

5. A receiver for use in a remote control system for receiving signals consisting of encoded message bits preceded by a start word, in which each bit of the message has been converted into a biphase bit having a predetermined bit period which comprises a first and a second bit interval and whose logic value is represented by a pulse during one of the first and second bit intervals, and in which the start word has been converted into a biphase start bit having the pulse in the first bit interval, said biphase start bit being distinguished from other biphase bits in that the second bit interval of the biphase start bit is equal to the bit period of the other biphase bits, said receiver comprising:
   means for receiving the transmitted biphase signal; and
   a decoding circuit for decoding the biphase start bit, starting in response thereto a periodic reference signal whose period corresponds to the predetermined bit period, and for regaining the original message, wherein said decoding circuit ignores the message if no biphase bit is received during a period of the periodic reference signal after decoding the biphase start bit.

6. A receiver as claimed in claim 5, in which the messages are encoded in a series of variable length and a code indicative of the number of bits in the message has been added to the message, wherein said decoding circuit decodes said code and ignores the message if the number of bits in the message does not correspond to said code.

7. A receiver as claimed in claim 6, in which said transmitted biphase signal includes, for a predetermined further message bit, a further biphase bit of which at least one of the first and second bit intervals is equal to the bit period of the other biphase bits, wherein said decoding circuit decodes the further biphase bit and ignores the message if the further biphase bit is not received.

8. A remote control system comprising a transmitter and a receiver, the transmitter comprising:
   generating means for generating a series of message bits constituting a message to be transmitted, and a start word preceding the message bits;
   an encoding circuit for converting each message bit into a biphase bit having a predetermined bit period which comprises a first and a second bit interval and whose logic value is represented by a pulse during one of the first and second bit intervals; and
   means for transmitting a biphase signal thus obtained to the receiver; and the receiver comprising:
       means for receiving the transmitted biphase signal; and
       a decoding circuit for decoding the start word, starting in response thereto a periodic reference signal whose period corresponds to the predetermined bit period, and for regaining the original message, wherein the encoding circuit converts the start word into a biphase start bit having the pulse in the first bit interval, said biphase start bit being distinguished from the other biphase bits in that the second bit interval of the biphase start bit is equal to the bit period of the other biphase bits, and the decoding circuit decodes said biphase start bit and ignores the message if no biphase bit is received during a period of the periodic reference signal after decoding the biphase start bit thereby regaining the original message.

9. A receiver as claimed in claim 5, in which said transmitted biphase signal includes, for a predetermined further message bit, a further biphase bit of which at least one of the first and second bit intervals is equal to the bit period of the other biphase bits, wherein said decoding circuit decodes the further biphase bit and ignores the message if the further biphase bit is not received.

* * * * *